W. X. Stevens
Vise.

№ 95,392.   Patented Sep. 28. 1869.

Witnesses;
J. C. Conway
Thos. S. Mercer

Inventor;
W. X. Stevens

United States Patent Office.

W. X. STEVENS, OF EAST BROOKFIELD, MASSACHUSETTS.

Letters Patent No. 95,392, dated September 28, 1869.

IMPROVED VISE.

The Schedule referred to in these Letters Patent and making part of the same.

*To whom it may concern:*

Be it known that I, W. X. STEVENS, of East Brookfield, in the county of Worcester, and State of Massachusetts, have invented certain new and useful Improvements in Hand-Vises; and I hereby declare the following to be a full, clear, and exact description of the same, reference being had to the accompanying drawings, in which—

The object of my invention is to produce a machine which will serve as a parallel-jawed hand-vise, and also as a self-centring drill-chuck, having suitable shanks for both bit-stock and lathe, also for a light bench-vise.

Figure 1:
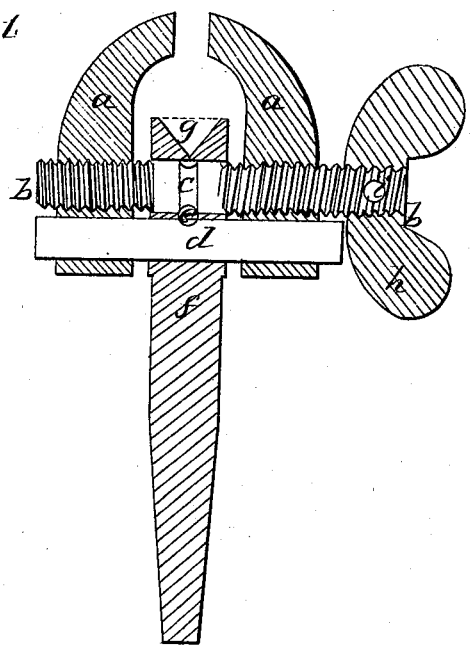
Figure 1 is a vertical section transverse to the jaws of the vise.

To these ends, my improved machine consists of a vise with two movable jaws, $a\ a$, fig. 1, sliding upon a cross-bar, $d$, by means of the right and left-hand screw $b$, whose threads work in corresponding threads in each jaw.

Said screw $b$ and cross-bar $d$ are parallel, and pass through the middle piece $f$, which piece $f$ serves as a handle and shank to the vise, and the combination of which, with the vise described, is the main feature of my invention.

The vise is made of any suitable material, but steel is preferable.

The shank-piece $f$ has its lower end squared and tapered to fit bit-stocks; its middle portion, for about an inch in length, is fitted for a lathe-socket; its upper end, for about an inch, should be square, and for good style of finish, it should be the same size as the body of the jaws.

In the upper end of the shank $f$ is a deep countersink, $g$, central with its body.

Cross-bar $d$ is fitted tightly through shank $f$, and firmly secured by key-pin $e$, which is driven tightly through shank $f$, so as to bear in a notch in the side of cross-bar $d$.

This pin $e$ also serves to keep the jaws $a\ a$ at equal distances from centre $g$, by means of groove $c$, around the body of screw $b$, running on it.

Screw $b$ is turned by means of a suitable thumb-lever, $h$, which is keyed firmly to it by pin $l$, passing through both.

Figure 2:
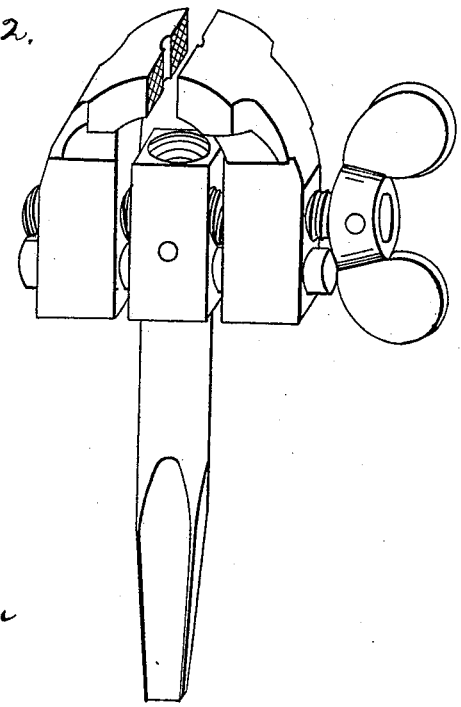
Figure 2 is a perspective view of it.

A notch is made vertically across the centre of the face of each jaw $a\ a$, in a line with the axis of shank $f$, as shown in fig. 2.

To use this instrument as a bench-vise, bore a suitable hole in the bench and drive shank $f$ into it.

To use it as a drill-chuck, place the shank of the drill firmly in counterbore $g$, turn up the thumb-screw $b$ until the vertical notches in jaws $a\ a$ guide the drill central and hold it fast. Then place shank $f$ in a lathe or bit-stock socket, as desired.

Its many uses as a hand-vise are too familiar to the artisan to require description. I am aware that the right and left screw combined, has been used to move jaws for many griping-purposes; also that a parallel guide-bar is used in many vises; but I am not aware that a shank placed central between two jaws, and connected to them by means of the binding-screw, and parallel bar, has ever before been used. Therefore,

What I claim as my invention, and wish to secure by Letters Patent, is—

The combination of the vise and shank, substantially as described, for the purposes specified.

In testimony whereof, I have signed my name to this specification, before two subscribing witnesses.

W. X. STEVENS.

Witnesses:
T. C. CONNOLLY,
THOS. S. MERCER.